United States Patent [19]

King et al.

[11] 4,247,400
[45] Jan. 27, 1981

[54] ROTARY RAKE STRUCTURE FOR A SETTLING TANK

[75] Inventors: Donald L. King, Bountiful; Gerald S. Glanville, Salt Lake City, both of Utah

[73] Assignee: Envirotech Corporation, Menlo Park, Calif.

[21] Appl. No.: 30,673

[22] Filed: Apr. 16, 1979

[51] Int. Cl.³ .............................................. B01D 21/18
[52] U.S. Cl. ..................................................... 210/531
[58] Field of Search ............... 210/232, 237, 528, 531; 29/428, 434, 469, 423

[56] References Cited

U.S. PATENT DOCUMENTS

| | | | |
|---|---|---|---|
| 2,064,151 | 12/1936 | Coulter | 210/531 |
| 2,528,051 | 10/1950 | Graner | 210/531 |
| 2,650,707 | 9/1953 | Scott | 210/531 |
| 2,861,693 | 11/1958 | Wool | 210/531 |
| 3,549,019 | 12/1970 | Theidel | 210/531 |
| 3,679,063 | 7/1972 | Pate | 210/531 |
| 3,770,131 | 11/1973 | Davis et al. | 210/519 |
| 3,959,152 | 5/1976 | Seifert | 210/531 |
| 4,172,040 | 10/1979 | Bona | 210/531 |

OTHER PUBLICATIONS

Second College Edition, Webster's New World Dictionary, The World Publishing Co., 1908, 1313.
"Eimco Clarithickener Sludge Thickening Clarifier", Form No. PMD-1032A, 11/73.
"Municipal Equipment Division Clarifiers from Eimco", Form No. MED-111-11-72.
"Eimco Reactor-Clarifier Treatment Units for Water Clarification and Softening & Wastewater Treatment", Form No. PMD-B5077R.

Primary Examiner—Ernest G. Therkorn
Attorney, Agent, or Firm—Robert E. Krebs

[57] ABSTRACT

A rotary rake structure for use in a settling tank comprises a torque transmitting member and a pair of rake arms. The torque transmitting member is mounted in the tank for rotation about a vertical axis. Each rake arm comprises one or more upper chords and one or more lower chords, the two rake arms being symmetrically disposed on opposite sides of the vertical axis of rotation along a transverse axis generally perpendicular to the axis of rotation. The upper and lower chords of each rake arm are fixedly positioned with respect to each other by truss members. The upper chords of both rake arms are attached to the torque transmitting member so as to permit pivotal motion of each rake arm in a plane containing the transverse axis and the vertical axis of rotation. Scraping devices depend from the lower chords for raking sediment at the bottom of the tank when the rake arms are rotated by the torque transmitting member. The end of each lower chord adjacent the axis of rotation terminates in a flange. The flanged end of each lower chord of one rake arm is spaced apart from the flanged end of a corresponding lower chord of the other rake arm by shim means in order to maintain each rake arm at a desired orientation with respect to the bottom of the tank.

20 Claims, 3 Drawing Figures

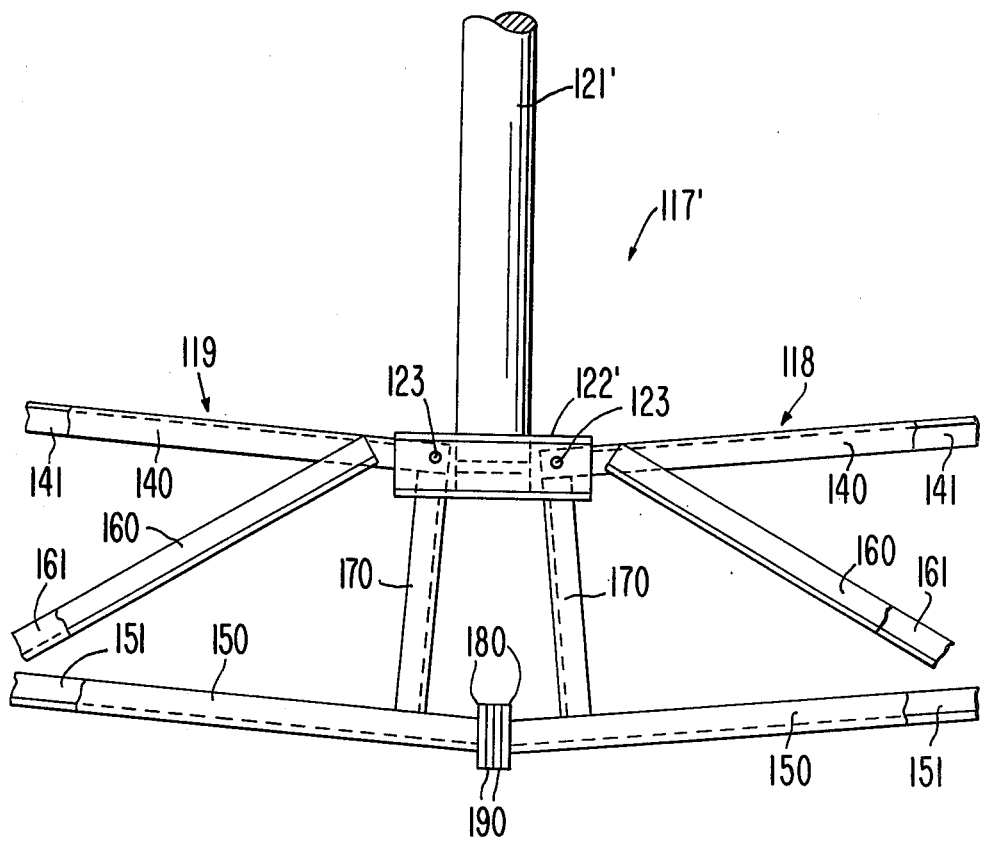

ROTARY RAKE STRUCTURE FOR A SETTLING TANK

BACKGROUND OF THE INVENTION

1. Field of the Invention

This invention pertains generally to sedimentation equipment for use in applications such as water purification, sewage treatment and liquid waste clarification. In particular, this invention comprises a novel structure for raking sediment at the bottom of a settling tank.

2. State of the Art

A settling tank is usually of cylindrical configuration, and is commonly provided with a rotary rake structure to move sediment along the bottom of the tank. In general, the transverse diametric dimension of a settling tank is several times larger than the depth. A rotary rake structure for use in a settling tank ordinarily comprises a torque transmitting member mounted for rotation about the axis of the tank and a pair of rake arms attached to the torque transmitting member. The rake arms extend radially outward in opposite directions from the torque transmitting member, and support scraping devices for moving sediment on the bottom of the tank to a well that is usually located at the center of the tank. A settling tank provided with a rotary rake structure of a kind known to the prior art is described in U.S. Pat. No. 3,770,131, which is assigned to Envirotech Corporation.

Typically, the torque transmitting member of a rotary rake structure comprises either a cage structure or a vertical shaft, and each of the two oppositely extending rake arms is a frame structure comprising one or more upper chords and one or more lower chords. The configurations of the two rake arms are substantially the same for a given rotary rake structure. The upper and lower chords of each rake arm are fixedly positioned with respect to each other by truss members, and each rake arm is attached to the torque transmitting member in such a way as to maintain a desired orientation with respect to the bottom of the settling tank. Scraping devices depend from the lower chords of the rake arms to sweep along the bottom of the settling tank when torque is applied to the rake arms by the torque transmitting member.

According to design considerations prevailing in the prior art, the lower chords of the rake arms were attached to the torque transmitting member in such a way as to accept the transmission of all the torque applied to the rake arms by rotation of the torque transmitting member. Thus, the joint connecting one of the lower chords to the torque transmitting member had to be able to withstand very high shearing force components in both the horizontal and vertical directions.

Furthermore, according to the prevailing design considerations of the prior art, the trusses holding the upper chords in fixed position relative to the lower chords accepted the vertical force components attributable to the weight of the rake arms and the weight of any solids that settle on the frame structures of the rake arms. The upper chords in the prior art were merely braced for stabilizing the other members of the rake arm structure, and were not considered to be subject to vertical shearing forces. In the prior art, the loads accepted by the upper chords were considered to be essentially horizontally directed along the axis of the upper chords.

In the prior art, the torque transmitting member extended downward all the way to the lower chords of the rake arms. The width of that portion of the torque transmitting member between the upper and lower chords of the rake arms usually imposed a limitation on the width of the rake arms because attached of a rake arm to the torque transmitting member was most practically accomplished by aligning the upper and lower chords of the rake arm with corners on the torque transmitting member.

Where the torque transmitting member in the prior art was a cage structure, the lateral dimensions of the cage structure had to be greater than necessary for the application of torque to the rake arms. The extra width of the cage structure in the prior art was necessary to provide an unobstructed sediment well and/or feed inlet arrangement adjacent the axis of the torque transmitting member. In the prior art, the bottom portion of the cage structure extended close to the bottom of the tank. If the downward extension of the cage structure could have been lessened (i.e., if the bottom portion of the torque transmitting member could have been raised significantly above the floor of the tank), a cage structure of smaller width (and hence of less weight) could have been used.

In installing rake arms in the prior art, each rake arm was individually positioned so that its lower chord (or chords) would assume an appropriate orientation with respect to the contour of the floor of the tank. The orientation of the lower chords had to be such that scraping devices affixed to the lower chords could effectively sweep along the floor of the tank during rotation of the rake arms. Adjustment of the orientation of each rake arm was accomplished by means of a turnbuckle or threaded rod "take-up" connection at the upper chords, or by means of shims placed between attachment flanges on the lower chords. The rake arms of the prior art, after being individually positioned, were then permanently secured to the torque transmitting member (as by welding or bolting) to form a single rigid structure extending diametrically across the settling tank.

The process of welding or otherwise attaching each of the upper and lower chords of a rake arm to the torque transmitting member in the prior art had to be performed with precision in order to maintain the proper orientation of the rake arm. For a typical two-arm rotary structure of the prior art, about 8 separate upper and lower chords and truss members had to be welded or bolted to the torque transmitting member. A lack of precision in the forming of any one of these joints could destroy the proper orientation of a rake arm.

SUMMARY OF THE INVENTION

It is an object of the present invention to provide a rotary rake structure for use in a settling tank, which rake structure requires significantly less shop fabrication effort and field erection time than was possible with rotary rake structures known to the prior art.

It is also an object of this invention to provide a rotary rake structure for use in a settling tank, which rake structure permits a wide range of interchangeability of rake arms of various sizes without limitation caused by the size and configuration of the torque transmitting member. In particular, it is an object of this invention to provide a rotary rake structure in which the torque transmitting member is a cage structure mounted for rotation about a vertical axis, and in which the minimum lateral dimension of the rake arms is not determined by the dimensions of the cage structure. Thus, according to the present invention, rake arms of various widths could be used in conjunction with a torque transmitting cage structure having a given width.

A further object of this invention is to provide a rotary rake structure for use in a settling tank, which rake structure requires less material for its fabrication than was possible with rotary rake structures having similar capabilities in the prior art.

In accordance with the present invention, a rotary rake structure for use in a settling tank comprises a torque transmitting member and a pair of rake arms, the torque transmitting member being mounted in the tank for rotation about a vertical axis, each rake arm comprising upper chords and lower chords, the upper and lower chords of each rake arm being rigidly positioned with respect to each other by truss members. The rake arms of the present invention extend in opposite directions from each other along a common transverse axis that is substantially perpendicular to the vertical axis of the torque transmitting member. This transverse axis defines the directions in which the rake arms extend, and does not necessarily indicate the orientation of the upper and lower chords of the rake arms. The lower chords are substantially parallel to the floor of the settling tank. In the typical case where the floor is sloped inward toward the center, the lower chords are not perpendicular to the vertical axis of the torque transmitting member and hence are not parallel to the transverse axis indicating the direction of extension of the rake arms.

The orientation of upper chords of the rake arms depends upon how the frame structures comprising the components of the rake arms are designed. The upper chords might be parallel to the lower chords, in which case the upper chords would not be perpendicular to the vertical axis of the torque transmitting member. In an alternative design, however, the upper chords might extend perpendicularly outward from the vertical axis to meet the lower chords at the distal end of the rake arms. The upper chords are pivotally attached to the torque transmitting member, whereby torque is transmitted to the rake arms through the upper chords.

The attachment of each upper chord to the torque transmitting member according to the present invention is accomplished by an appropriate mechanical connecting means, such as a pin or bolt, that is capable of supporting the total load of the rake arm and transmitting the torque. Each lower chord has a flanged end adjacent the axis of rotation of the torque transmitting member, and shims are provided between the flanged ends of corresponding lower chords of the two rake arms so that each rake arm can be maintained in proper orientation with respect to the bottom of the settling tank.

In a particular embodiment of this invention, each rake arm comprises two upper chords, both of which are secured to the lower chord by truss members. In a preferred embodiment of this invention, a pair of upper chords and a pair of lower chords are provided. In all embodiments of this invention, the lower chord or chords support scraping devices arranged to sweep sediment along the bottom of the settling tank when torque is applied to the rake arms. In the usual case, this sediment is raked toward and into a well at the center of the tank.

Field installation of a rotary rake structure in accordance with the present invention involves a first step of securing the upper chord or chords of each rake arm to the torque transmitting member in such a way as to permit pivotal motion of the rake arm in a plane containing the vertical axis of the torque transmitting member. This pivotal attachment may be made by means of a pin or bolt. This first step may be accomplished without regard to the slope or contour of the tank bottom, because the rake arms can be allowed to pivot freely about the connecting pins or bolts. By eliminating the need for precision welding of a number of chords and truss members to the torque transmitting member, the present invention greatly reduces the time and labor requirements of field installation.

The second step in the field installation of a rotary rake structure according to the present invention involves pivoting the rake arms separately about their respective connecting pins or bolts until the lower chords assume desired orientations with respect to the bottom of the settling tank. After each of the rake arms has been pivoted into correct orientation with respect to the bottom of the tank, jacks or blocks are used to maintain the rake arms in their proper orientations for the remainder of the installation process.

The third step in the field installation of a rotary rake structure according to the present invention involves inserting shims between opposing flanged ends of the lower chords of the two symmetrically disposed rake arms so as to maintain the proper orientation of each rake arm after the supporting jacks or blocks are removed. When the shims are in place, the pins or bolts about which the rake arms can pivot then are tightened in order to secure the rake arms rigidly to the torque transmitting device. The jacks or blocks supporting the weight of the rake arms are then removed and field assembly is complete. After the removal of the supporting jacks or blocks, the opposing flanged ends of the lower chords bear compressively on the shims, which are preferably made of the same material as the structural components of the rake arms.

A rotary rake structure according to the present invention enables a shorter and lighter torque transmitting member to be used than was possible in the prior art, because only the upper chords of the rake arms need to be secured to the torque transmitting member. Consequently, in comparison with the prior art, the present invention provides a significant savings in the amount of structural material needed to fabricate a rotary rake structure.

DESCRIPTION OF THE DRAWING

FIG. 3 is a fragmentary cross-sectional view showing the pivotal attachment of a pair of rake arms to a torque transmitting vertical shaft in accordance with the present invention.

DESCRIPTION OF PREFERRED EMBODIMENTS

Figure 1:
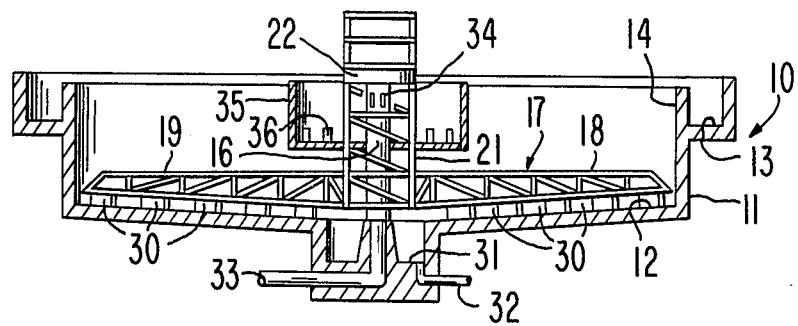
FIG. 1 is a cross-sectional view of a prior art settling tank showing a typical rotary rake structure known to the prior art.

A settling tank 10 with associated sediment raking apparatus of a kind known to the prior art is illustrated in FIG. 1. The tank 10 is defined by marginal upstanding sidewalls 11 and a bottom 12, a peripheral launder 13 equipped with an overflow weir 14, a centrally positioned hollow pier 16 rising from the bottom of the tank, and a rotary rake structure generally designated by the reference number 17.

The rake structure 17 comprises symmetrically disposed rake arms 18 and 19 supported on a torque transmitting cage structure 21, which is rotatably driven by a drive mechanism 22 mounted at the top of the pier 16. The rake arms 18 and 19 support a plurality of scraping devices 30, which move along the tank bottom 12 as the rake structure 17 is rotated. The scraping devices 30 rake sediment that has accumulated at the bottom 12 toward a central well 31 for collection and/or removal, usually by pumping means but in some cases by gravity discharge, through an underground pipe means 32.

As shown in FIG. 1, the liquid to be treated enters the settling tank 10 via an underground conduit 33, and rises through the pier 16 to ports 34 adjacent the upper end of the pier 16. The liquid then flows out through the ports 34 into a feedwell 35 from which the liquid passes through ports 36 into the surrounding tank 10. Alternatively, however, the liquid to be treated could enter the tank 10 via a conduit passing through the sidewall 11 or over the sidewall 11.

The rake arms 18 and 19 of the rotary rake structure 17 extend in opposite directions from the torque transmitting cage structure 21 along a common axis transverse to the vertical axis of rotation. The rake arms 18 and 19 shown in FIG. 1, which is illustrative of the prior art, comprise upper and lower chords that are rigidly secured as by welding or bolting to the cage structure 21. Field installation of such a prior art rotary rake structure 17 required precise positioning of each rake arm individually relative to the contour of the bottom 12 of the settling tank 10 before the upper and lower chords 18 and 19 could be welded or otherwise rigidly attached to the cage structure 21. Adjustment of the orientation of each rake arm was usually accomplished by means of a turnbuckle or threaded rod "take-up" connection on each of the upper chords.

In the prior art, as illustrated in FIG. 1, the torque transmitting cage structure 21 extended from adjacent the top of the pier 16 (or from whatever means was used to support the cage structure 21 along a vertical axis in the center of the tank 10) all the way down to the bottom chords of the rake arms 18 and 19. This required the lateral dimensions of the cage structure 21 to be wide enough to clear the pier 16 and any other structures for securing the pier 16 within the tank 10, as for example the foundation shown in FIG. 1 for supporting the pier 16 within the central well 31. This clearance requirement in many cases meant that the lateral dimensions of the cage structure 21 had to be wider than necessary for transmitting torque to the rake arms 18 and 19. If the lower extremity of the cage structure 21 could be raised away from the bottom 12 of the tank 10, a narrower (and hence lighter) cage structure could be used.

The fact that both the upper and lower chords of each of the rake arms 18 and 19 had to be rigidly secured as by welding or bolting to the torque transmitting cage structure 21 meant that at least twice as much time was required in the prior art to install a rotary rake structure than would have been required if only the upper chords had to be secured to the torque transmitting cage 21.

Figure 2:
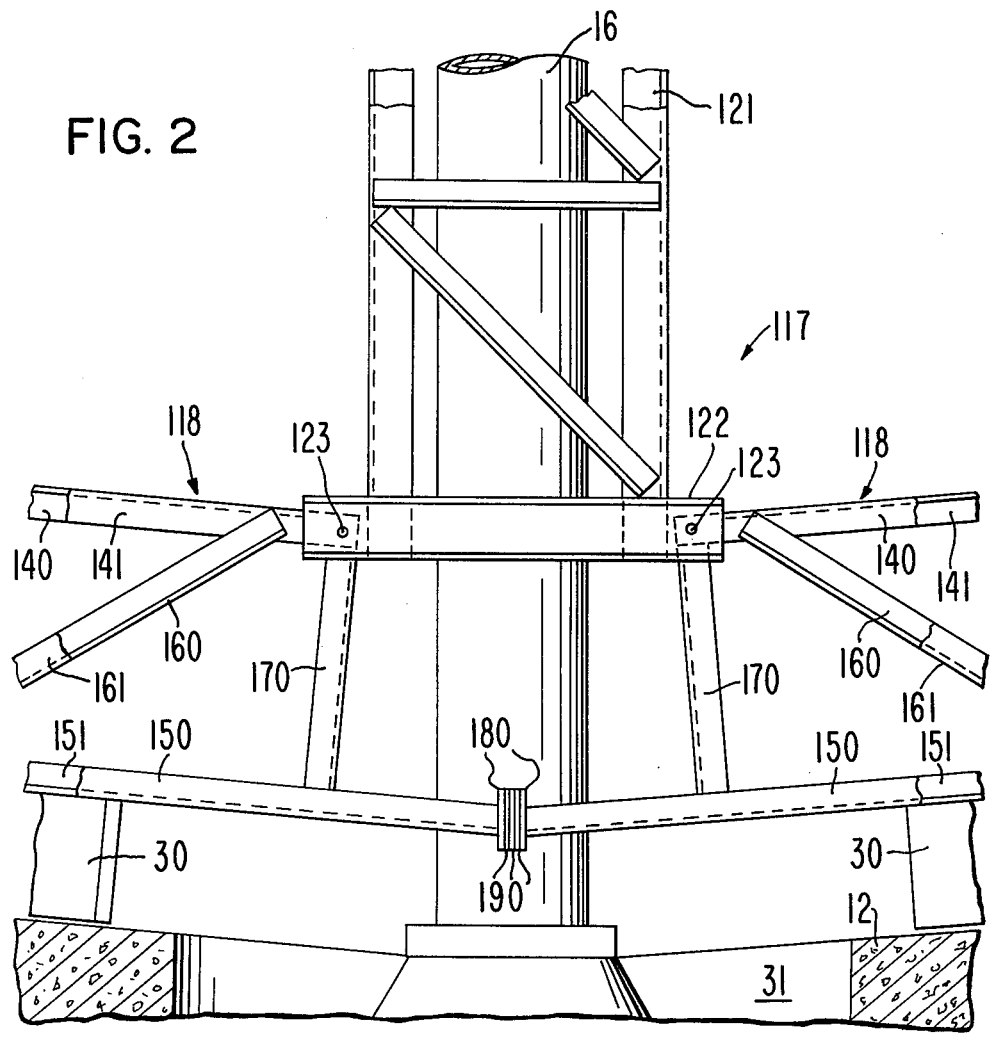
FIG. 2 is a fragmentary cross-sectional view showing the pivotal attachment of rake arms to a torque transmitting cage structure in accordance with the present invention.

FIG. 2 provides a cross-section view of a preferred embodiment of a rotary rake structure 117 according to the present invention. The rake structure 117 is more economical with respect to material used and shop fabrication time, as well as with respect to field installation manpower and time, than the rake structures of the prior art as illustrated in FIG. 1.

As shown in FIG. 2, the rake structure 117 comprises symmetrically disposed rake arms 118 and 119 supported on a torque transmitting cage structure 121, which is mounted as in the prior art for rotary motion about a vertical axis. The rake arms 118 and 119 are substantially identical in construction, and extend symmetrically with respect to each other in opposite directions from the cage structure 121 along a common axis transverse to the vertical axis of rotation.

The cage structure 121 is fabricated in accordance with conventional design considerations using structural steel members. The chords and trusses of the rake arms 118 and 119 are likewise fabricated as in the prior art from structural steel members. Scraping devices 30 are mounted from the lower chords 150 and 151 to rake sediment along the bottom 12 of the settling tank 10 when torque is transmitted to the rake arms 118 and 119.

The following detailed description of the rake arm 118 applies in like manner to the rake arm 119. The rake arm 118 preferably comprises a pair of upper chords 140 and 141 and a pair of lower chords 150 and 151, which are held rigidly in position with respect to each other by appropriate truss members of which only the diagonal truss pair 160, 161 and the vertical truss 170 extending between the upper and lower pairs of chords are visible in FIG. 2. The end of each lower chord adjacent the vertical axis of rotation terminates in a flange 180, and the flanged end of each lower chord of the rake arm 118 is spaced apart from the flanged end of a corresponding lower chord of the rake arm 119 by shims 190.

The upper chords 140 and 141 are hinged to the cage structure 121 so as to permit each of the rake arms 118 and 119 to pivot in a plane defined by the common transverse axis of the rake arms 118 and 119 and the vertical axis of the torque transmitting cage structure 121. The lower chords 150 and 151 are not secured to the torque transmitting member 121, and torque is transmitted to the rake arms 118 and 119 through the upper chord connections.

The lower extremity of the cage structure 121 is formed by an end member 122 that is adapted to permit attachment of each of the rake arms 118 and 119 thereto by pivot joints. A pin or bolt 123 passes through appropriately located apertures in the end member 122 and in the upper chords 140 and 141 of the rake arm to provide hinged attachment of the rake arm to the end member 122. The apertures in the upper chords 140 and 141 and in the end member 122 are in alignment with each other to permit passage of the pin or bolt therethrough. The pin or bolt 123 must be strong enough to support the weight of the rake arm as well as to transmit torque to the rake arm.

As shown in FIG. 2, the dimensions of the end member 122 are related to the dimensions of the cage structure 121, and the width of the rake arms 118 and 119 corresponds to the width of the end member 122. This is not to imply, however, that the width of the rake arms 118 and 119 is necessarily determined or constrained by the width of the cage structure 121. For particular applications where narrower or wider widths for the rake arms 118 and 119 are desired, the end member 122 can be provided with appropriate extensions or other suitable attachment means to accommodate the attachment thereto of rake arms of whatever width may be desired.

To install the rake arm 118, the pin or bolt 123 is first passed through apertures in the end member 122 of the cage structure 121 and through the apertures in the radially inner ends of the upper chords 140 and 141. The other rake arm 119 is secured to the end member 122 in the same way on the opposite side of the cage structure 121. The pin or bolt 123 provides a hinge about which the rake arm 118 can pivot in a plane that includes the vertical axis of the cage structure 121. The other rake arm 119 is likewise hingedly mounted on the end member 122 for pivotal motion in the same plane. In this way, the rake arms 118 and 119 can be secured to the torque transmitting cage structure 121 without having to be precisely positioned with respect to the bottom 12 of the tank 10.

After the rake arms 118 and 119 are pivotally secured to the torque transmitting cage structure 121, the rake arms 118 and 119 are individually pivoted about their respective hinge joints until the lower chords 150 and 151 of each rake arm assume an appropriate orientation with respect to the bottom 12 of the tank 10. The desired orientation of the lower chords 150 and 151 is that which properly positions the depending scraping devices 30 for moving sediment along the bottom 12.

The hinged rake arms 118 and 119 are supported in proper orientation by jacks or blocks until shims 190 are inserted between the flanged ends of corresponding lower chords 150 and 151 on the two rake arms. When the shims 190 are in place, the opposing flanged ends on the lower chords of the two rake arms bear compressively against each other. The pins or bolts 123 are then tightened in order to secure the rake arms 118 and 119 in position. After the pins or bolts 123 are tightened, the jacks or blocks are removed, and the entire weight of a rake arm is then borne by each pin or bolt 123.

In FIG. 3, an alternative embodiment of this invention is illustrated wherein the torque transmitting member comprises a vertical shaft 121' depending from a suitable support structure and extending downwardly into the tank 10. The shaft 121' terminates in an end member 122', which is adapted to permit hinged attachment of each of the rake arms 118 and 119 thereto by means of pins or bolts 123 in the manner described above in connection with FIG. 2.

The above specification discloses particular embodiments in which each rake arm comprises a pair of upper chords, each upper chord being pivotally attached directly to the torque transmitting member. It would be within the scope of this invention, however, if each of the upper chords were attached to a coupling member that is pivotally attached to the torque transmitting member. In such an arrangement, torque would be transmitted from the torque transmitting member through the coupling member to the rake arms.

The present invention resides generally in the concept of transmitting torque to the upper chords of each rake arm of a rotary rake structure. Deviations from the structural details described herein would therefore be possible, and yet still be within the scope of the invention. Consequently, the invention is limited only by the following claims and their legal equivalents.

What is claimed is:

1. A rotary rake structure for use in a settling tank, said rake structure comprising a torque transmitting member and a pair of rake arms, said torque transmitting member being mounted within said tank for rotary motion, each rake arm comprising an upper chord and a lower chord, said upper and lower chords of each rake arm being rigidly positioned with respect to each other, said upper chord of each rake arm being coupled to said torque transmitting member, said lower chord of each rake arm being spaced apart from said torque transmitting member, the lower chords of said rake arms being without mechanical connection to said torque transmitting member except through the upper chords of said rake arms and wherein an end of the lower chord of each of said rake arms terminates in a flange, the flanged end of the chord of one rake arm being spaced apart by shim means from the flanged end of the lower chord of the other rake arm.

2. The rotary rake structure of claim 1 wherein said torque transmitting member is mounted for rotary motion about a vertical axis, and wherein said rake arms extend along a common transverse axis in opposite directions from said vertical axis.

3. The rotary rake structure of claim 1 wherein said lower chord is supported from said upper chord by truss means.

4. The rotary rake structure of claim 3 wherein each of said rake arms comprises a pair of lower chords, both lower chords of said pair being supported from said upper chord.

5. The rotary rake structure of claim 1 wherein said upper chord is pivotally attached to said torque transmitting member.

6. The rotary rake structure of claim 5 wherein each of said rake arms comprises a pair of upper chords, both upper chords of said pair being pivotally attached to said torque transmitting member.

7. The rotary rake structure of claim 6 wherein both upper chords of said pair are rigidly positioned with respect to each other by truss means.

8. The rotary rake structure of claim 6 wherein each of said rake arms comprises a pair of lower chords, both lower chords of said pair of lower chords being supported from said pair of upper chords.

9. The rotary rake structure of claim 6 wherein each upper chord of said pair of upper chords has an aperture, and wherein both upper chords of said pair of upper chords are attached to said torque transmitting member by means of an elongate member passing through the aperture on each of said upper chords.

10. The rotary rake structure of claim 9 wherein said elongate member comprises a pin.

11. The rotary rake structure of claim 9 wherein said elongate member comprises a bolt.

12. The rotary rake structure of claim 1 wherein said torque transmitting means comprises a cage structure.

13. The rotary rake structure of claim 12 wherein said cage structure is mounted for rotary motion about the axis of a centrally disposed pier extending from the bottom of said tank.

14. The rotary rake structure of claim 1 wherein said torque transmitting means comprises a shaft supported so as to extend vertically downward into said tank.

15. The rotary rake structure of claim 1 wherein said upper chord has an aperture, and wherein said upper chord is attached to said torque transmitting member by means of an elongate member passing through said aperture.

16. The rotary rake structure of claim 1 wherein said lower chord supports scraping means for raking sediment at the bottom of said tank.

17. A rotary rake structure for use in a settling tank, said rake structure comprising a torque transmitting member and a pair of rake arms, said torque transmitting member being mounted within said tank for rotary motion, each rake arm comprising a pair of upper chords and at least one lower chord, said upper and lower chords of each rake arm being rigidly positioned with respect to each other, each upper chord of each rake arm being attached to said torque transmitting member, said lower chord of each rake arm being spaced apart from said torque transmitting member, all lower chords of said rake arms being without mechanical connection to said torque transmitting member except through the upper chords of said rake arms and wherein an end of each lower chord of said pair of lower chords of each rake arm terminates in a flange, the flanged end of each lower chord of one rake arm being spaced apart by skim means from the flanged end of a corresponding lower chord of the other rake arm.

18. The rotary rake structure of claim 17 wherein said torque transmitting member is mounted for rotary motion about a vertical axis, and wherein said rake arms extend along a common transverse axis in opposite directions from said vertical axis.

19. The rotary rake structure of claim 18 wherein said upper chords are pivotally attached to said torque transmitting member.

20. The rotary rake structure of claim 19 wherein said rake arm comprises a pair of lower chords, both lower chords being supported from said pair of upper chords.

* * * * *